(12) United States Patent
Kawasaki

(10) Patent No.: US 6,371,396 B1
(45) Date of Patent: Apr. 16, 2002

(54) DUAL-BEARING REEL BRAKING DEVICE

(75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/568,991

(22) Filed: May 11, 2000

(30) Foreign Application Priority Data

May 13, 1999 (JP) .......................................... 11-133199

(51) Int. Cl.[7] .............................................. A01K 89/02

(52) U.S. Cl. .................................. 242/289; 188/181 A

(58) Field of Search ....................... 242/289; 188/181 A

(56) References Cited

FOREIGN PATENT DOCUMENTS

JP          11-075643          3/1999

*Primary Examiner*—Emmanuel M. Marcelo
(74) *Attorney, Agent, or Firm*—Shinjyu Global IP Counselors, LLP

(57) ABSTRACT

To provide a centrifugal braking mechanism for dual-bearing reel by which an adjustment of a braking force is performed in an easy and accurate manner. A centrifugal braking mechanism 23 is a mechanism for braking a spool 12, which includes a rotary member 66, a plurality of braking members 68, a stationary member 67, a coupling pin 24, and a braking force adjusting mechanism 69. The rotary member is rotatably supported by a bearing housing 64a in a non-movable manner in an axial direction. The plurality of braking members are movably coupled to the rotary member and moves when a centrifugal force is applied. The stationary member is non-rotatably coupled to a brake case 64 in a movable manner in the axial direction. The braking force is adjusted by moving the stationary member in the axial direction. The coupling pin non-rotatably couples the rotary member to a spool shaft 16 in a movable manner in the axial direction. The braking force adjusting mechanism is a member for adjusting the braking force that is generated when the stationary member is moved in the axial direction to make contact with the braking members.

8 Claims, 7 Drawing Sheets

DUAL-BEARING REEL BRAKING DEVICE

BACKGROUND OF THE INVENTION

1. Technical Field

The present invention relates to braking devices, in particular to braking devices on dual-bearing reels for braking the spool in a dual-bearing reel.

2. Description of Related Art

In dual-bearing reels referred to as a bait reels, utilized mainly for lure fishing, generally braking force is made to act on the spool so that backlash, wherein the rotational speed of the spool when casting is faster than the line wind-out speed, does not occur. As examples of this class of braking device centrifugal braking mechanisms that employ centrifugal force developing from spool rotation to brake the spool, and casting control mechanisms that mechanically brake the spool shaft by grasping either end of the spool spindle are known.

Japanese Laid-Open Pat. App. No. 10-304798 discloses a centrifugal braking mechanism in this class of braking device, wherein the braking force is adjustable from the outer side of the reel body.

The centrifugal braking mechanism is furnished with a rotary member that rotates linked with the spool; a plurality of braking members disposed in radial fashion on the rotary member; a stationary member that comes into contact with the tips of the braking members; and a braking force adjustment mechanism. The braking members of the plurality are fitted to, and pivotable around axes along chord directions of, the rotating member; by centrifugal force they pivot within planes that pass through the axis of the spool. The stationary member is non-rotatably fitted to the reel body but able to travel in the spool spindle direction, and can come into contact with braking members that have rocked due to centrifugal force. A mechanism that shifts the stationary member back and forth in the spool spindle direction, the braking force adjustment mechanism is for adjusting braking force that contacting of the braking members on the stationary member generates.

In the above-noted conventional centrifugal braking mechanism, when the spool rotates centrifugal force acts on the braking members, and the braking members rock heading spool-spindle outward. The braking members then contact the stationary member, which brakes the spool. Shifting the stationary member in the axial direction by means of the braking force adjustment mechanism adjusts the braking force by altering its moment according to the rocking angle of the braking members during contact with the stationary member.

Casting control mechanisms, on the other hand, are furnished with friction plates disposed on either end of, as a pair sandwiching, the spool spindle, and a cap provided screw-mated to the reel body in order to regulate the grasping force by the friction plates. In the casting control mechanism, the spool shaft is braked by turning the cap, which presses the spool spindle more towards the friction plate on the other end than the friction plate on the one end.

In the conventional braking devices noted above, the spool spindle shifts slightly when adjusting the braking force with the casting control mechanism. When the spool shaft shifts, this accompanied by the rotary member of the centrifugal braking mechanism also shifting axially, along with its braking members.

When the braking members shift axially, the clearance between them and the stationary member—fitted to be shiftable on the reel body—becomes different from the pre-shift clearance, and the braking-member rocking angle changes. When adjusting the braking force with the casting control mechanism, therefore, the braking force exerted from the centrifugal braking mechanism will sometimes change even if the stationary member is disposed into the same position axially. Accordingly, in the above-noted conventional centrifugal braking mechanism, being able to adjust the braking force accurately when the spool spindle shifts is highly unlikely.

SUMMARY OF THE INVENTION

An object of the present invention is to facilitate, and enable to be accurately performed the operation of adjusting the braking force in dual-bearing reel braking devices.

The braking device for a dual-bearing reel as determined by a first aspect of the present invention is a device for braking a spool which is provided with a reel body of the dual-bearing reel and includes a rotating member, a plurality of braking members, a fixing member, a coupling means, and a braking force adjusting means. The rotating member is rotatably provided with the reel body in a non-movable manner in an axial direction. The plurality of braking members is movably provided with the rotating member and moved by a centrifugal force. The fixing member is non-rotatably provided with the reel body in a movable manner in the axial direction. The fixing member, when moved in the axial direction, is capable of making contact with the braking members, which are moved by a centrifugal force, in a different frictional state. The coupling means is a means for non-rotatably coupling the rotating member to an interlocking member which interlocks with the spool in a movable manner in the axial direction. The braking force adjusting means is a means for adjusting a braking force. The braking force adjusting means moves the fixing member in the axial direction and adjusts a braking force which is generated when the fixing member is moved in the axial direction and makes contact with the braking members.

In this braking device, when the spool rotates, the interlocking members including the spool shaft and the spool itself rotate together with the spool, and the rotating member which is non-rotatably coupled to the interlocking members by the coupling means rotates together with the spool. When the rotating member rotates, the braking members move towards the fixing member by a centrifugal force. Then, when the braking members make contact with the fixing member, a braking force is applied to the rotating member due to friction between the braking members and the fixing member, and the spool is braked. At that time, a friction state between the fixing member and the braking members becomes different depending on the position of the fixing member in the axial direction and the braking force applied varies accordingly. Therefore, an adjustment of the braking force may be easily carried out by moving the fixing member in the axial direction of the rotating member by using the braking force adjusting means. Also, since the rotating member is rotatably provided with the reel body in a non-movable manner in the axial direction and coupled to the interlocking members by the coupling means in a movable manner in the axial direction, the rotating member does not move in the axial direction if the interlocking members such as the spool shaft are moved in the axial direction by fluctuation of the interlocking member or an operation of the casting control mechanism. Thus, the distance between the rotating member and the fixing member does not change unless the fixing member is intentionally moved. For this reason, a predetermined braking force is not changed if the interlocking members are moved and, hence, an adjustment of the braking force may be performed in an accurate manner.

The braking device for a dual-bearing reel as determined by a second aspect of the invention is, in braking devices in the first aspect, one wherein the spool is non-rotatably coupled to a spool shaft which is the interlocking member and the coupling means is provided with the spool shaft and non-rotatably couples the rotating member to the spool shaft in a movable manner in the axial direction. In this device, when the spool rotates, the spool shaft is rotated and the braking members, via the coupling member, make contact with the fixing member to brake the Spool. At that time, the rotating member does not move in the axial direction if the spool shaft is moved in the axial direction since the rotating member is coupled to the spool shaft by the coupling means in a movable manner in the axial direction. Accordingly, if the spool shaft is moved due to fluctuation of the spool shaft or an operation of the casting control mechanism, the braking force is not changed.

The braking device for a dual-bearing reel as determined by a third aspect is, in braking devices in the first or second aspect, one wherein the fixing member has an inner surface of a cone shape which functions as a braking surface, the inner surface being disposed so as to face an outer periphery side of the rotating member and be concentric with the rotating member and the braking members are radially disposed so as to face the braking surface, each of the braking members being provided with the rotating member in a movable manner to a respective movement limit position and capable of making contact with the braking surface by a centrifugal force. In this device, since the braking surface of the fixing member has a cone shape, the diameter of a osculating circle formed by a contact of the braking members with the braking surface is reduced as the fixing member is moved towards the rotating member and, accordingly, the distance required for the braking members to move in order to make contact with the braking surface is shortened. For this reason, the number of braking members which may make contact with the braking surface gradually increases since the braking member which has a movement limit position close to the rotating member becomes capable of making contact with the braking surface and, hence, the braking force is increased. On the other hand, when the fixing member is moved away from the rotating member, the braking force is gradually decreased. At that time, the distance between the fixing member and the rotating member is not changed if the interlocking members are moved in the axial direction since the rotating member is not moved and, therefore, the diameter of the osculating circle does not change. For this reason, the braking force does not vary if the interlocking members are moved in the axial direction.

The braking device for a dual-bearing reel as determined by a fourth aspect of the invention is, in braking devices in the third aspect, one wherein the braking members are provided with the rotating member so as to be movable in a direction substantially right angle to the braking surface. In this device, since the braking members make contact with the braking surface substantially at right angle and a component of centrifugal force which is vertical to the braking surface becomes a vertical drag for generating friction for braking, a centrifugal force may be efficiently converted to a braking force.

The braking device for a dual-bearing reel as determined by a fifth aspect of the present invention is, in braking devices in the third or fourth aspect, one wherein the fixing member includes a supporting portion non-rotatably supported by the reel body in a movable manner in an axial direction of the spool and a main portion integrally formed with the supporting portion, the main portion having the inner surface of cone shape which functions as the braking surface, and the braking force adjusting means includes a lever portion movably provided with the reel body, the lever portion being exposed to outside of the reel body and a converting mechanism for converting movement of the lever portion to a movement of the main portion in an axial direction of the spool. In this device, since the main portion of the fixing member which is supported by the reel body is moved in the axial direction when the lever portion which is exposed outside is moved, the braking force may be adjusted by a simple operation from outside.

The braking device for a dual-bearing reel as determined by a sixth aspect is, in braking devices in the first or second aspect, one wherein the braking members are radially provided with the rotating member with a space between each other in a circumferential direction of the rotating member so as to be movable around an axis along a chord direction, their position of center of gravity being placed at a the spool side with respect to a center of movement, and the fixing member has an annular braking surface, the annular braking surface may make contact with an end portion of the braking members and is provided substantially right angle to a rotational axis of the rotating member. In this device, when the spool rotates, the end portion of the respective braking member which is movably provided with the rotating member moves towards the fixing member and makes contact with the fixing member to brake the spool. The braking force is determined by the angle of the braking members when they make contact with the fixing member. At this time, if the interlocking members move in the rotational axis direction, the rotating member is not affected by the movement. Accordingly, the angle of the braking members when they make contact with the fixing member is not changed. Thus, the braking force may be adjusted in an easy and accurate manner.

The braking device for a dual-bearing reel as determined by a seventh aspect of the invention is, in braking devices in any of the first through sixth aspects, one that further comprises a casting control mechanism which is capable of braking the spool by holding the coupling member. In this device, the braking force of the braking members in not changed if the interlocking members are moved in the axial direction by an operation of the casting control mechanism.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
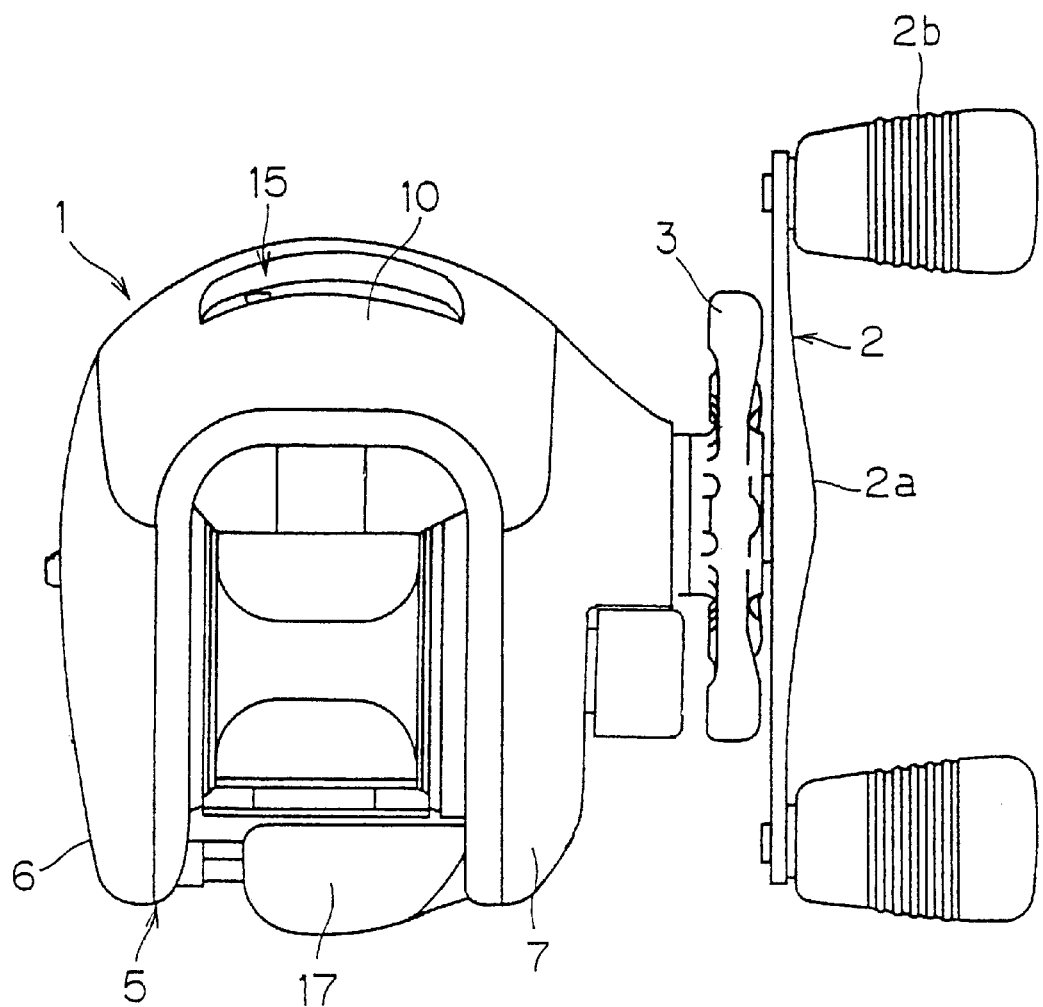
FIG. 1 is a plan view of a dual-bearing reel in which one embodiment of the present invention is adopted.

FIG. 1 is a plan view of a dual-bearing reel to which an embodiment according to the present invention is applied.

The dual-bearing reel shown in the figure is a bait reel chiefly used for lure fishing and includes a reel body 1, a handle 2, and a star drag 3 for adjusting drag. The handle 2 is provided for rotating the spool and is disposed at one side of the reel body 1. The star drag 3 is disposed on the reel-body side of the handle 2. The handle 2 is of a double-grip type having a plate-type arm portion 2a and holding portions 2b, each of which is rotatably provided on respective ends of the arm portion 2a. The outer surface of the arm portion 2a of the handle 2 is a smooth seamless surface to keep fishing line from getting tangled on it.

Figure 2:
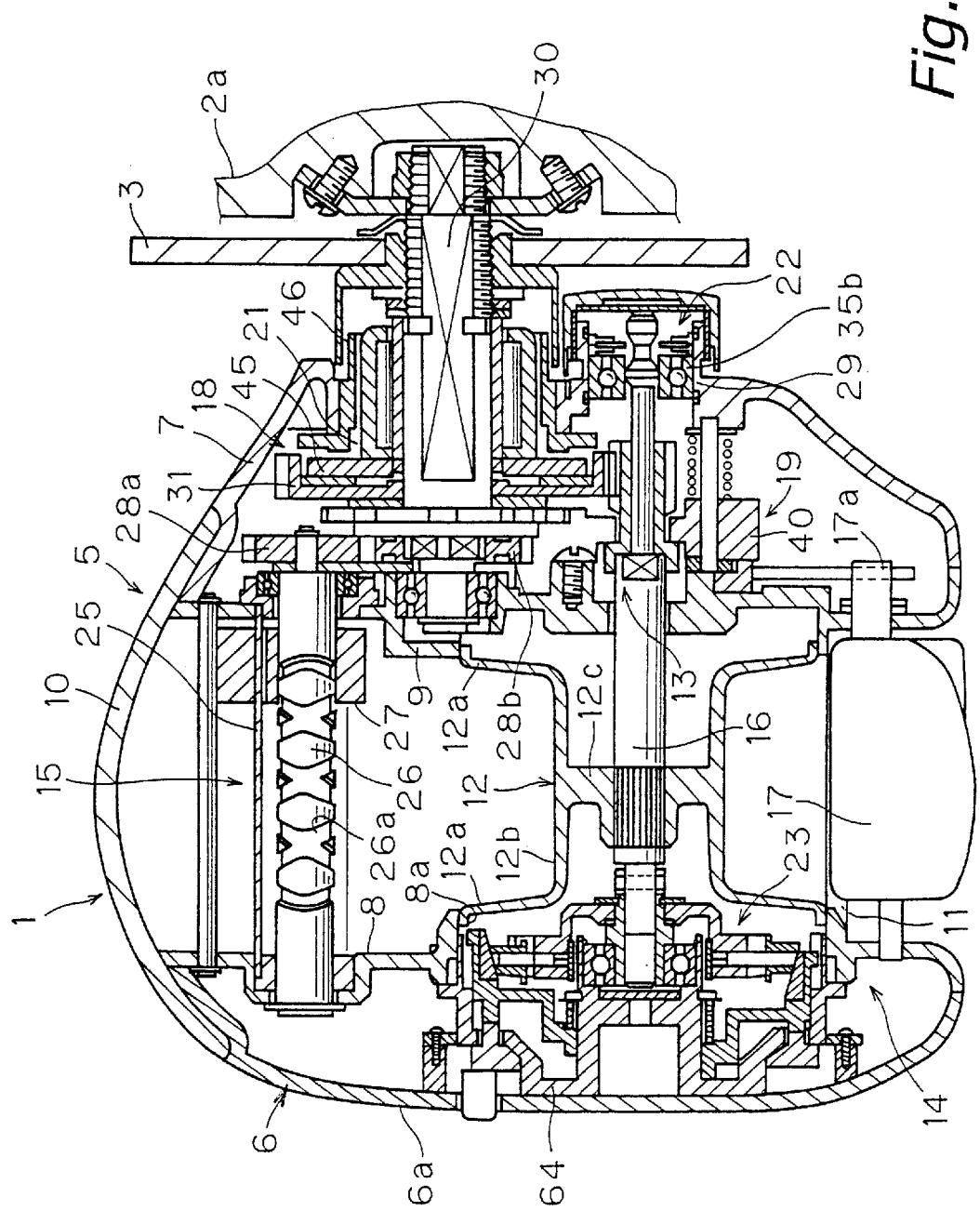
FIG. 2 is a plan view in section through the reel depicted in FIG. 1.

As shown in FIG. 2, the reel body 1 includes a frame 5, a first side-cover 6, a second side-cover 7, and a front cover 10. The first side-cover 6 and the second side-cover 7 are disposed on respective sides of the reel frame 5. The front cover 10 is disposed to be open/closable on a front portion of the frame 5. The frame 5 includes a pair of side plates 8 and 9, which are disposed opposite each other at a predetermined spacing, and a plurality of connecting members, each of which connects the side plates 8 and 9.

The second side-cover 7, which is located on the handle 2 side, is fixed to the side plate 9 by screws so that it may be detached from the side plate 9. The first side-cover 6, which is located on the opposite side of the handle 2, is detachably attached to the side plate 8 of the frame 5. The first side-cover 6 includes a cover body 6a and a brake case 64. The cover body 6a curves outwardly in a bowl shape, and the brake case 64 is fixed to the cover body 6a by screws. The brake case 64 will be described in detail later.

As shown in FIG. 2, the spool 12, a level wind mechanism 15, and a thumb rest 17 are disposed inside the frame 5. The level wind mechanism 15 is provided for uniformly reeling in fishing line around the spool 12. The thumb rest 17 is a pad for the thumb during a thumbing operation. A gear mechanism 18, a clutch mechanism 13, a clutch engage/release mechanism 19, a drag mechanism 21, and a casting control mechanism 22 are disposed in the space between the frame 5 and the second side-cover 7. The gear mechanism 18 transmits rotational force from the handle 2 to the spool 12 and the level wind mechanism 15. The clutch engage/release mechanism 19 switches the clutch mechanism 13 in accordance with the operation of the thumb rest 17. Furthermore, a centrifugal braking mechanism 23 for preventing backlash during casting is provided between the frame 5 and the first side-cover 6.

Spool Section Configuration

The spool 12 on either side has dish-shaped flange portions 12a, and between the flange portions 12a has tubular line-winding trunk 12b. Also, the spool 12 has a tubular boss portion 12c that is formed integral with the inner peripheral side of the line-winding trunk 12b in the middle. By for example, a serration engagement the spool 12 is non-rotatably fixed to the spool spindle 16, which penetrates through the boss portion 12c. The means for fixing the spool 12 to the spool spindle 16 is not limited to the serration engagement and various other means such as key coupling or spline coupling may be used.

Figure 3:
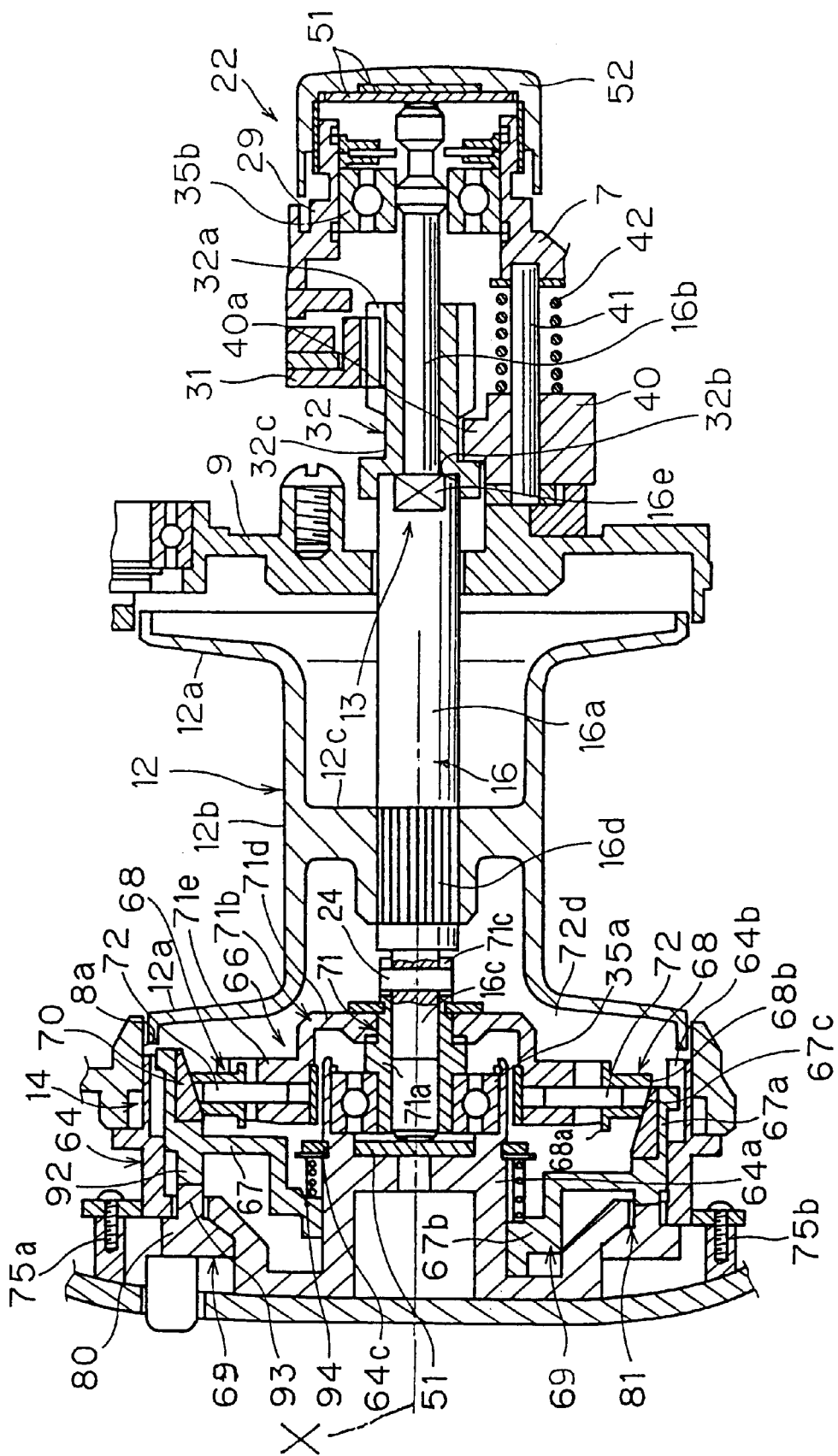
FIG. 3, corresponding to FIG. 2, is a fragmentary enlarged sectional view of the spool and its surroundings.

As shown in FIG. 3, the spool spindle 16 penetrates the side plate 9 and extends outside the second side-cover 7. The extended end of the spool spindle 16 is rotatably supported by bearing 35b of a boss portion 29 which is provided with the second side-cover 7. Also, bearing 35a in the centrifugal braking mechanism 23 rotatably supports the other end of the spool spindle 16. The bearings 35a and 35b are shielded ball bearings. The spool spindle 16 has a central large-diameter portion 16a to which the spool 12 is fixed and two (right and left) small-diameter portions 16b and 16c, formed on either end of the large diameter portion 16a.

The large-diameter portion 16a is disposed in a space within the spool body 12b of the spool 12, and serrations 16d are formed on the outer surface of the middle of the large-diameter portion 16a, for fixing the spool 12. A pair of beveled portion 16e parallel to each other, and which form a part of the clutch mechanism 13, is provided on the right-hand side of the large-diameter portion 16a as shown in FIG. 3.

A rotary member 66 of the centrifugal braking mechanism 23 is rotatably coupled to the periphery of the left small-diameter portion 16c to be axially movable. The bearing 35a supports the rotary member 66 in the brake case 64. A coupling pin 24 for coupling the rotary member 66 is fitted on the right end of the small-diameter portion 16c as shown in FIG. 3. The coupling pin 24 diametrically penetrates the right end of the small-diameter portion 16c and couples the rotary member 66 to the spool spindle 16 to be non-rotatable yet axially shiftable. As a result, the bearing 35a via the rotary member 66 rotatably supports the other end of the spool spindle 16.

A pinion gear 32 is supported on the right small-diameter portion 16b to be axially shiftable. The bearing 35b rotatably supports the end of the small-diameter portion 16b on the boss portion 29. Also, both ends of the spool spindle 16 are made superficially spherical to keep down increase in rotational resistance.

The level wind mechanism 15 includes a guide tube 25, a worm shaft 26, and a line guide 27. The guide tube 25 is fixed between the pair of side plates 8 and 9. The worm shaft 26 is rotatably supported in the guide tube 25. A gear 28a, which forms a part of the gear mechanism 18, is fixed to one end of the worm shaft 26. Also, a spiral groove 26a is formed on the worm shaft 26, and the line guide 27 is meshed with the spiral groove 26a. The line guide 27 therefore reciprocates along the guide tube 25 by the worm shaft 26 being rotated via the gear mechanism 18. A fishing line is inserted in the line guide 27 and uniformly wound onto the spool 12.

The gear mechanism 18 includes a main gear 31, a pinion gear 32, the above-mentioned gear 28a, and a gear 28b. The main gear 31 is fixed to a handle shaft 30. The pinion gear 32 is cylindrical and is engaged with the main gear 31. The gear 28a is fixed to one end of the worm shaft 26. The gear 28b is non-rotatably fixed to the handle shaft 30 and engaged with the gear 28a.

Disposed outward of the side plate 9, the pinion gear 32 is a cylindrical member whose center the spool spindle 16 penetrates, as shown in FIG. 3. The pinion gear 32 is coupled to the spool spindle 16 to be axially shiftable. The pinion gear 32 includes teeth 32a, a meshing portion 32b, and a constriction 32c as shown in FIG. 3. The teeth 32a are formed circumferentially on the right end of the pinion gear 32 and mesh with the main gear 31. The meshing portion 32b is formed on the other side of the pinion gear 32. The constriction 32c is provided between the teeth 32a and the meshing portion 32b. The meshing portion 32b includes an oblong cavity formed in the end face of the pinion gear 32. A beveled portion 16e formed on one end of the large-diameter portion 16a of the spool spindle 16 engages in the oblong cavity. In this embodiment, when the pinion gear 32 is moved outward, disengaging beveled portion 16e of the spool spindle 16 from the oblong cavity in the meshing portion 32b, the rotational force from the handle shaft 30 is not transmitted to the spool 12. Thus the clutch mechanism 13 is constituted by the oblong cavity in the meshing portion 32b and the beveled portion 16e.

As shown in FIG. 2, the thumb rest 17 is disposed in the rear of the spool 12 between the pair of side plates 8 and 9. The thumb rest 17 is also used as a clutch lever. An elongated hole (not shown) is formed in the side plates 8 and 9 of the frame 5, and the thumb rest 17 is supported to be shiftable in the elongated hole. Thus, the thumb rest 17 slides up and down along the elongated hole.

The clutch engage/release mechanism 19 includes a clutch yoke 40 as shown in FIG. 3. By turning movement of the thumb rest 17, the clutch engage/release mechanism 19 shifts the clutch yoke 40 parallel to the axis of the spool spindle 16. Further, when the handle shaft 30 is rotated in the line reeling-in direction, the clutch engage/release mechanism 19 shifts the clutch yoke 40 whereby the clutch mechanism 13 is automatically put on. The clutch yoke 40 is disposed about the outer periphery of the spool spindle 16 and is supported on two pins 41 (only one of them is shown in the figure) to be shiftable parallel to the axis of the spool spindle 16. The spool spindle 16 is rotatable relative to the clutch yoke 40. That is, this makes it so that the clutch yoke 40 does not rotate though the spool spindle 16 rotates. Also, in the middle of the clutch yoke 40 is an engaging portion 40a that is engaged in the constriction 32c of the pinion gear 32. Moreover, spring 42 is provided surrounding each of the pins 41 between the clutch yoke 40 and the second side-cover 7. The clutch yoke 40 is always urged inward (i.e., clutch engagement-ward) by the spring 42.

In this configuration, the pinion gear 32 is normally situated in the inward clutch-engaging position wherein the meshing portion 32b is engaged with the beveled portion 16e of the spool spindle 16, which is the clutch-on state. On the other hand, when the clutch yoke 40 shifts the pinion gear 32 outward, the meshing portion 32b is disengaged from the beveled portion 16e, which is the clutch-off state.

The drag mechanism 21 includes as shown in FIG. 2 a friction washer 45 that presses on the main gear 31, and a pressing plate 46 for pressing, the friction washer 45 on the main gear 31 at a predetermined force by rotation of the star drag 3.

The casting control mechanism 22 includes as shown in FIG. 3 a plurality of friction plates 51 arranged sandwiching either end of the spool spindle 16, and a cap 52 for adjusting the grasping force on the spool spindle 16 due to the friction plates 51. The left-end friction plates 51 are fitted within the brake case 64. The cap 52 is screw-mated with the circumferential surface of the boss portion 29. In this casting control mechanism 22, turning the cap 52 for example clockwise advances the cap 52 leftward in FIG. 3. This presses spool spindle 16 further against the friction plates 51 on the cap 52 end, and shifts slightly leftward in FIG. 3, which strengthens the friction plate 51 pair's grasping force on the spool 12 and makes the braking force on the spool 12 larger. Turning the cap 52 counterclockwise retracts the cap 52 rightward in FIG. 3, and the spool spindle 16 shifts slightly rightward in FIG. 3 due to elasticity of the friction plates 51 on the brake case 64 end. This weakens the friction plate 51 pair's grasping force, which lessens the braking force applied on the spool 12.

Centrifugal Braking Mechanism Configuration

As shown in FIG. 2, the centrifugal braking mechanism 23 is accommodated in the brake case 64, configured in the first side-cover 6. The brake case 64 is a short cylindrical member having a bottom configured in the reel body 1. The brake case 64 may be fixed to the cover body 6a by using, for instance, two screws 75a and 75b, as the enlarged view in FIG. 3 shows. The brake case 64 is attachably/detachably fitted into the side plate 8 by a bayonet structure 14 at the circumference of a circular opening 8a formed in the side plate 8 for passing the spool 12. Thus, the first side-cover 6 is removably attached to the side plate 8. A cylindrically shaped bearing housing 64a protruding inward is formed in the center of the bottom of the brake case 64. The bearing 35a for rotatably supporting the spool spindle 16, and the rotary member 66 of the centrifugal braking mechanism 23 are accommodated in the bearing housing 64a. The friction plates 51 of the casting control mechanism 22 are fitted in a bottom surface formed intermediate axially in the bearing housing 64a.

The centrifugal braking mechanism 23 includes: the rotary member 66, supported in the bearing housing 64a to be rotatable yet axially immobile; a plurality of braking members 68 fitted on the rotary member 66; a stationary member 67 able to come into contact with the braking members 68 in different frictional states; the coupling pin 24; and a braking force adjusting mechanism 69 for adjusting braking force that develops from the braking members 68 contacting the stationary member 67.

The rotary member 66 is supported via the bearing 35a in the bearing housing 64a to be allowed to rotate yet be axially immobile. The rotary member 66 includes a rotor 71 coupled to the spool spindle 16 by the coupling pin 24 to be non-rotatable yet permit axial shift, and six, for example, guide shafts 72 in a radiating arrangement on the rotor 71. The rotor 71 includes a cylindrical portion 71a allowed to rotate fitted circumferentially on the small diameter portion 16c of the spool spindle 16 yet axially immobile, and a guide anchor 71b fitted to the FIG. 3 right-end outer periphery of the cylindrical portion 71a to be both non-rotatable and axially immobile. The bearing 35a is fitted on the FIG. 3 left end of the cylindrical portion 71a. A large diameter portion is formed in the middle of the cylindrical portion 71a, sandwiched between the inner race of the bearing 35a and the guide anchor 71b. A pair of engaging grooves 71c into which the coupling pin 24 interlocks is formed on the right end of the cylindrical portion 71a. The axial length of the engaging groove 71c is longer than the diameter of the coupling pin 24 and an axial gap is formed between the bottom of the engaging groove 71c and the coupling pin 24. The rotary member 66 therefore allows axial shift in the spool spindle 16. The rotary member 66 thus is coupled by the coupling pin 24 to be non-rotatable with respect to the spool spindle 16 yet to permit shift, and moreover is allowed to rotate supported in the bearing housing 64a yet is axial immobile. The rotary member 66 therefore rotates linked with the spool 12. Nevertheless, even with the spool spindle 16 shifting axially, the rotary member 66 does not shift.

The guide anchor 71b includes a disk portion 71d and a shaft anchor 71e. The inner side of the disc plate portion 71d is non-rotatably fitted to the cylindrical portion 71a and is axially immobile. From the circumferential end of the disc plate portion 71d heading peripherally outward of the bearing housing 64a extends the shaft anchor 71e, inside which the guide shafts 72 are radially stood on their extended tips.

Figure 4:
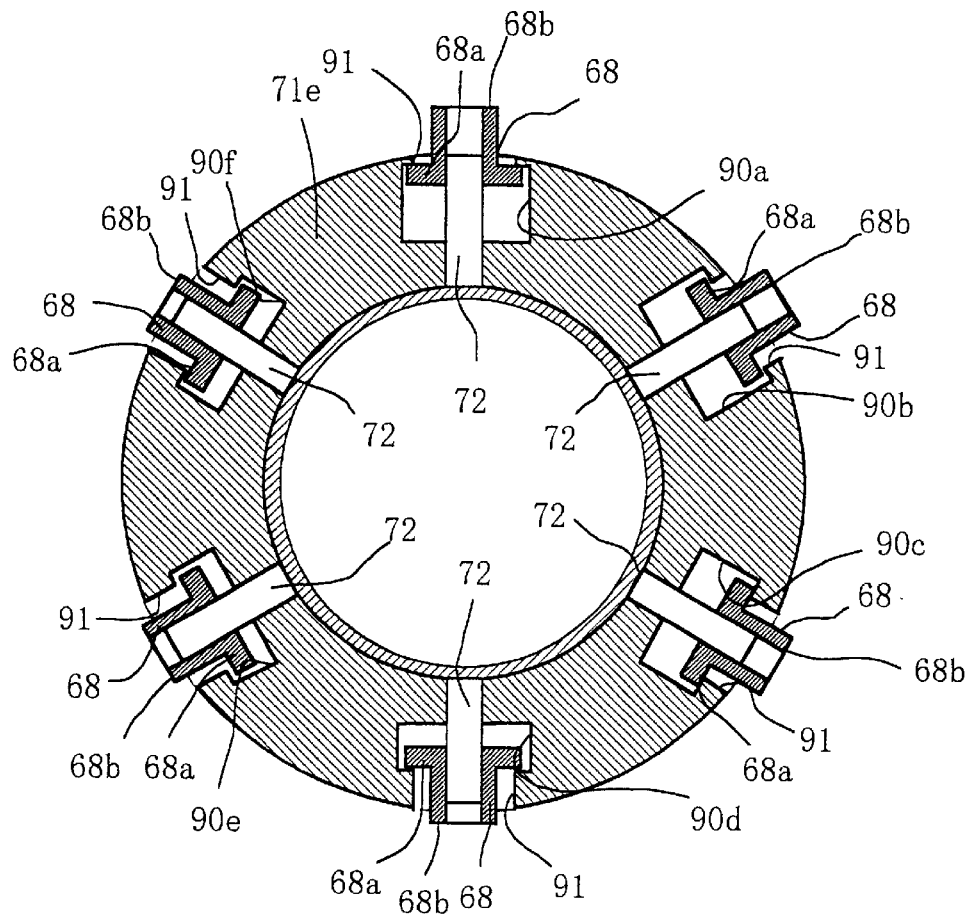
FIG. 4 is an elevational view of a centrifugal braking mechanism rotary member.

The shaft anchor 71e is a thick, disk-shaped member and, as shown in FIG. 4, six regulator spaces 90a through 90f differing in length in the radial direction of the shaft anchor 71e are formed encompassing the stood sections of the guide shafts 72. The guide shafts 72 are radially arranged in the centers of the regulator spaces 90a to 90f. openings 91 in which the braking members 68 are shiftable are formed at the outer peripheral ends of the regulator spaces 90a to 90f.

Figure 5:
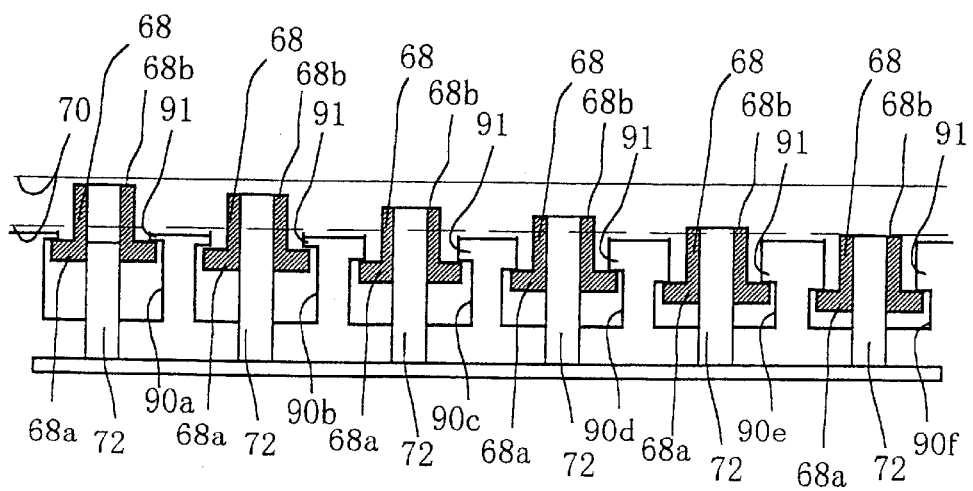
FIG. 5 is a schematic view illustrating a braking member arrangement.

Each of the plurality of the braking members 68 is a cylindrical member having base-end collar 68a. The braking members 68 are fitted on the guide shafts 72 to permit radial travel and shift radially outward under centrifugal force. The collars 68a are furnished to interlock with the opening portions 91, as shown in FIG. 5, when centrifugal force shifts the braking members 68 radially, to check any further radially outward shift. The braking members 68 thus can travel radially outward different distances. Contact faces 68b that contact on a brake liner 70 fitted to the stationary member 67 are formed on the tips of the braking members 68. The contact faces 68b are slant surfaces conforming to the brake liner 70.

As shown in FIG. 5, the diametrical length of the regulator space 90a to the opening 91 is set to a length at which the end of the braking member 68 shifted peripherally outward, when the stationary member 67 is in its retracted position parted furthest from the rotary member 66, cannot contact on the brake liner 70. Further, the length of the regulator space 90f is set to a length at which the end of the braking member 68 shifted peripherally outward, when the stationary member 67 is in its advanced position, can contact on the brake liner 70. The lengths of the middle regulator spaces 90b to 90e are then set to become shorter in even intervals, for example, in between.

The stationary member 67 is a cylindrical component having a cylindrical portion 67a disposed peripherally outward of the rotary member 66; and a support portion 67b formed integrally with the cylindrical portion 67a on its inner periphery and supported by the bearing housing 64a to permit axial travel. The brake liner 70 is removably fitted to the inner peripheral surface of the cylindrical portion 67a, and has a tapered surface flaring forward towards the spool 12. On the leading edge of the outer peripheral surface of the cylindrical portion 67a, an interlock projection 67c protrudes diametrically. The interlock projection 67c is interlocked with an engagement groove 64b formed on the inner peripheral surface of the brake case 64 along the axial direction. Consequently, the stationary member 67 is made non-rotatable with respect to the brake case 64, i.e. to the reel body 1. The support portion 67b is fitted to the bearing housing 64a to permit axial travel. A cam projection 92, which the braking force adjusting mechanism 69 comprises, is formed on the outward lateral surface of the support portion 67b. The cam projection 92 is an arc shaped protrusion, and the amount by which it projects gradually enlarges going one way circumferentially.

The braking force adjusting mechanism 69 is a device for moving the stationary member 67 fore-and-aft (in the spool axial direction) and includes a knob 80 and a converting mechanism 81. The knob 80 is supported in the brake case 64 to permit rotation. The converting mechanism 81 converts rotation of the knob 80 into a fore-and-aft advancing movement of the stationary member 67. The knob 80 is partially exposed outside the first side-cover 6 and is manipulable externally of the reel body 1. The knob 80 may be positioned into, for instance, seven-stage rotatory positions by means of a (not shown) positioning mechanism. That is, there are one brake-releasing position and six braking positions. An arc-shaped cam projection 93, which the converting mechanism 81 comprises, is formed on the right-end face of the knob 80, in a position opposing the cam projection 92. The amount by which the cam projection 93 protrudes gradually enlarges going the other way circumferentially, being an oppositely protruding form to that of the cam projection 92. The leading edge of the cam projection 92 on the stationary member 67 abuts on the cam projection 93. The converting mechanism 81 is composed of the two cam projections 92 and 93 and a return spring 94. The return spring 94 is arranged between the support portion 67b and a collar 64c fixed to the outer peripheral surface of the bearing housing 64a to be axially immobile, compressed on the outer peripheral surface of the bearing housing 64a, wherein it urges the stationary member 67 FIG. 3 leftward (toward its retracted position).

In the braking force adjusting mechanism 69, when the knob 80 is rotated in the one direction, the cam projection 92 rides up on the cam projection 93 and the stationary member 67 advances FIG. 3 rightward. Conversely, when the knob 80 is rotated in the other direction, the stationary member 67 retracts urged by the return spring 94. Herein, since the brake liner 70 is configured with the forward flaring tapered surface, the axial shifting of the stationary member 67 changes the diameter of the circle that touches the brake liner 70 and the braking member 68. Accordingly, the travel distance until the braking members 68 contact the brake liner 70 changes, and the number of braking members 68 that can come into contact with the brake liner 70 changes. As a result, the braking force can be adjusted easily from outside the reel body 1.

Herein for example when the knob 80 is put into the brake-release position, disposing the stationary member 67 into the retracted position, all of the braking members 68 are out of contact with the brake liner 70, and braking force does not act on the spool 12. This state is shown on the lower side of the centerline X in FIG. 3, and is indicated as well by the solid line in FIG. 5. Then when the knob 80 is rotated to advance the stationary member 67 gradually, drawing it near the rotary member 66, the braking members 68 contact the brake liner 70; moreover the number of braking members 68 coming into contact increases corresponding to the amount by which the stationary member 67 advances. Consequently, the braking force of the centrifugal braking mechanism 23 gradually increases. Thus, as indicated on the upper side of the centerline X in FIG. 3 and by the dashed line in FIG. 5, when the advanced position is reached, all of the braking members 68 are put into contact with the brake liner 70 and the braking force becomes maximal.

Since the centrifugal force increases in proportion to the square of the rotational speed, in the centrifugal braking mechanism 23 the braking force at each position on the stationary member 67 increases in proportion to the square of the rotational speed.

The centrifugal braking mechanism 23 braking force obtained by adjusting the knob 80 is not liable to fluctuate even if the braking force due to the casting control mechanism 22 alters. This is because the rotary member 66 is not directly fixed non-rotatably to the spool spindle 16, but is non-rotatably coupled to it and permits axial travel via the coupling pin 24—and at the same time is supported on the reel body 1 to permit rotation yet be axially immobile. That is, when the spool spindle 16 shifts axially by adjustment of the casting control mechanism 22, although the coupling pin 24 shifts axially, the rotary member 66 does not shift. Consequently, the clearance between the stationary member 67 adjusted by the knob 80 and the rotary member 66 does not fluctuate though the spool spindle 16 shifts. Therefore, the centrifugal braking mechanism 23 braking force is not liable to fluctuate even if the braking force due to the casting control mechanism 22 alters.

Reel Operation

In a normal state, the clutch yoke 40 is pressed inwardly (towards the left-hand side in FIG. 3) by the spring 42 and, hence, the pinion gear 32 is moved to the engaging position. In this state, the meshing portion 32*b* of the pinion gear 32 is engaged with the beveled portion 16*e* of the spool spindle 16 to achieve a clutch-on state. As a result, the rotational force from the handle 2 is transmitted to the spool 12 via the handle shaft 30, the main gear 31, the pinion gear 32 and the spool spindle 16 to rotate the spool 12 in the line reeling-in direction. At this time, although a centrifugal force is applied to the braking members 68 of the centrifugal braking mechanism 23 to move the braking members 68 outwardly in the radius direction, the braking force does not become so large since the rotation speed of the spool 12 is low and, hence, it does not interfere with the rotation of the handle 2. However, if it is necessary to reduce the braking force, the stationary member 67 may be positioned at a receded position by using the knob 80. As a result, all the braking members 68 cannot make contact with the brake liner 70 and no braking force by the centrifugal braking mechanism 23 is applied to the spool 12.

When a fishing line is cast, the braking force is adjusted to prevent backlash by using the knob 80. When the stationary member 67 is gradually moved forward by rotating the knob 80, the braking members 68 starts to make contact with the brake liner 70 and the number of the braking members 53 which make contact with the brake liner 70 is increased in accordance with the degree of movement of the stationary member 67. As a result, the braking force exerted by the centrifugal braking mechanism 23 is gradually increased. When the stationary member 67 reaches the most advanced position, all the braking members 68 make contact with the brake liner 70 and the braking force reaches its maximum.

Then, the thumb rest 17 may be pushed downwardly. In this embodiment, the thumb rest 17 is moved along an elongated hole formed on the side plates 8 and 9. The clutch yoke 40 is moved outwardly according to the movement of the thumb rest 17, and the pinion gear 32 which is engaged with the clutch yoke 40 is also moved in the same direction. As a result, the engaging portion of the pinion gear 32 is disengaged from the beveled portion 16*e* of the spool spindle 16 and the clutch is entered to a clutch-off state. In the clutch-off state, the rotation from the handle shaft 30 is not transmitted to neither the spool 12 nor the spool spindle 16, and the spool 12 may freely rotate. When a fishing rod is swung in the clutch-off state so that a reel is inclined in the axis direction in order for the spool spindle 16 to face a vertical surface while thumbing the spool 12 using a thumb on the thumb rest 17, a lure is cast and the spool 12 rotates vigorously in the line-releasing direction.

In this state, the spool spindle 16 is rotated in the line-releasing direction by the rotation of the spool 12 and the rotation is transmitted to the rotary member 66. When the rotary member 66 is rotated, the braking members 68 make contact with the brake liner 70 and the spool 12 is braked by the centrifugal braking mechanism 23 to prevent a generation of backlash.

In addition, if backlash of the spool 12 is caused by any chance, the problem may be easily dissolved since the first side-cover 6 is easily removed due to the bayonet structure 14.

Figure 6:
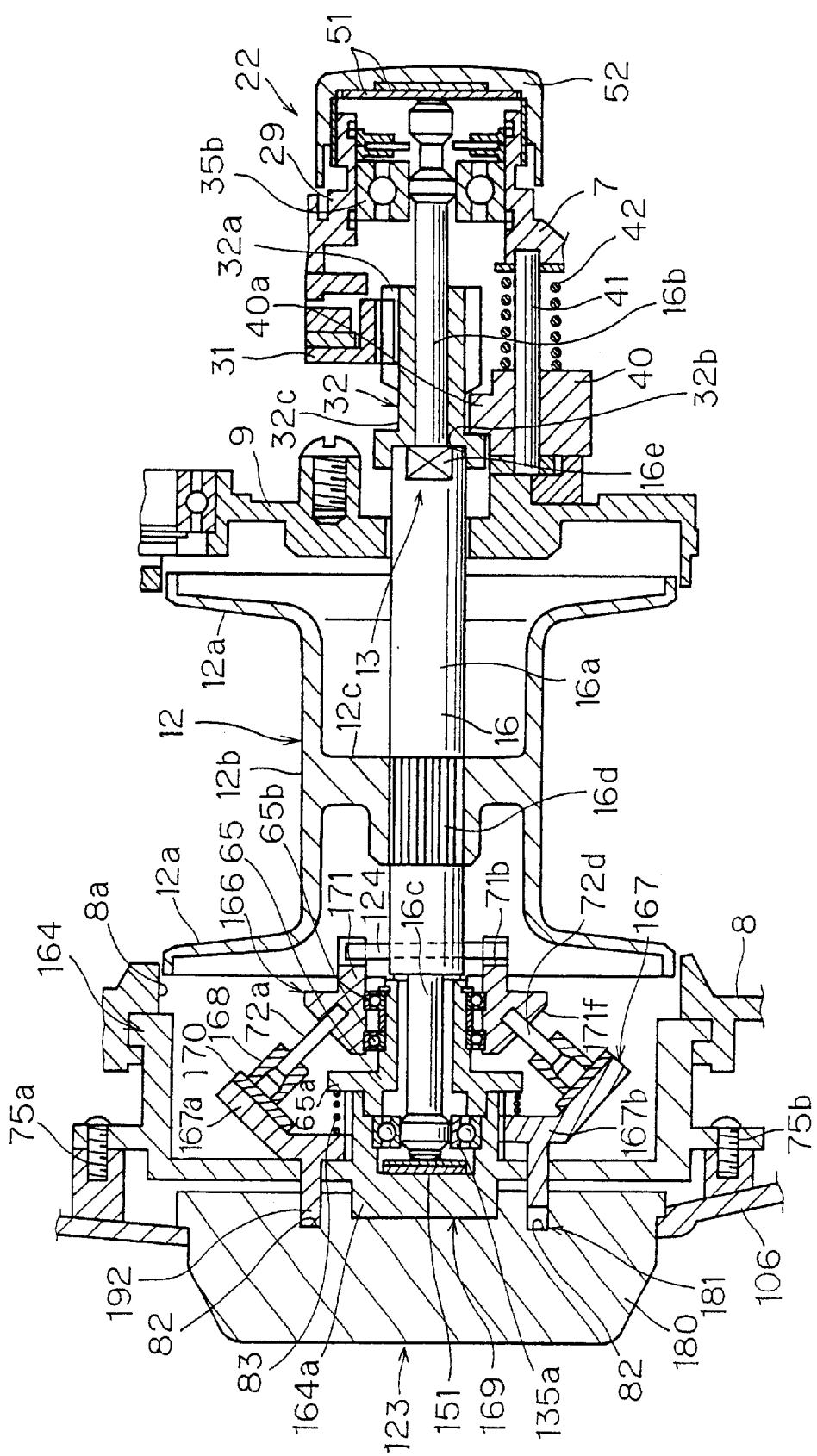
FIG. 6 is a view corresponding to FIG. 3 in another embodiment.

Other Embodiments (a) Although in the foregoing embodiment the guide shafts 72 are disposed radiating along diametric directions, as shown in FIG. 6, guide shafts 72*a* to 72*f* may be disposed radiating orthogonally to the brake liner 170. Also, control of the travel distance may be by the guide shafts.

As shown in FIG. 6, the centrifugal braking mechanism 123 is placed in the brake case 164. A bearing housing 64*a* of a cylindrical shape protruding outwardly as well as inwardly is formed on the center of the bottom of the brake case 164. The bearing 135*a* for supporting the spool spindle 16 is accommodated in the bearing housing 64*a* and the frictional plate 151 of the casting control mechanism 22 is attached to the bottom surface thereof. Also, a rotation supporting member 65 is fixed to the end of the bearing housing 64*a* by a screw. The rotation supporting member 65 is a cylindrical member having a narrow part, and a collar 65*a* for being engaged with one end of the return spring 83 which forms a part of the braking force adjusting mechanism 169 is formed on the outer surface thereof. The rotary member 166 of the centrifugal braking mechanism 123 is rotatably supported by the outer periphery of an end (right-hand side in FIG. 3) of the rotation supporting member 65 in a non-movable manner in the axial direction via a pair of bearings 65*b*. As a result, the rotary member 166 is rotatably supported by the reel body 1 in a non-movable manner in the axial direction.

The centrifugal braking force 123 includes the rotary member 166, the stationary member 167, the braking members 168, and the braking force adjusting mechanism 169. The rotary member 166 is rotatably supported by the rotation supporting member 65 in a non-movable manner in the axial direction. The stationary member 167 is placed in the brake case 164 in a movable manner in the back and forth direction. The brake liner 170 of a cone shape is disposed in the inner side of the stationary member 167. The number of the braking members 168 may be six, and they may be radially disposed inner side of the brake liner 170 with a space between each other in the circumferential direction. The braking force adjusting mechanism 169 is used to move the stationary member 167 in the spool axis direction.

The rotary member 166 includes the rotor 171, and the guide shafts 72*a* to 72*f*. The rotor 171 is non-rotatably coupled to the spool spindle 16 in a movable manner in the axial direction by a coupling pin 124. The number of the guide shafts 72*a* to 72*f* may be six, and they are disposed radially to the rotor 171 so as to substantially cross the brake liner 170 orthogonally.

Figure 7:
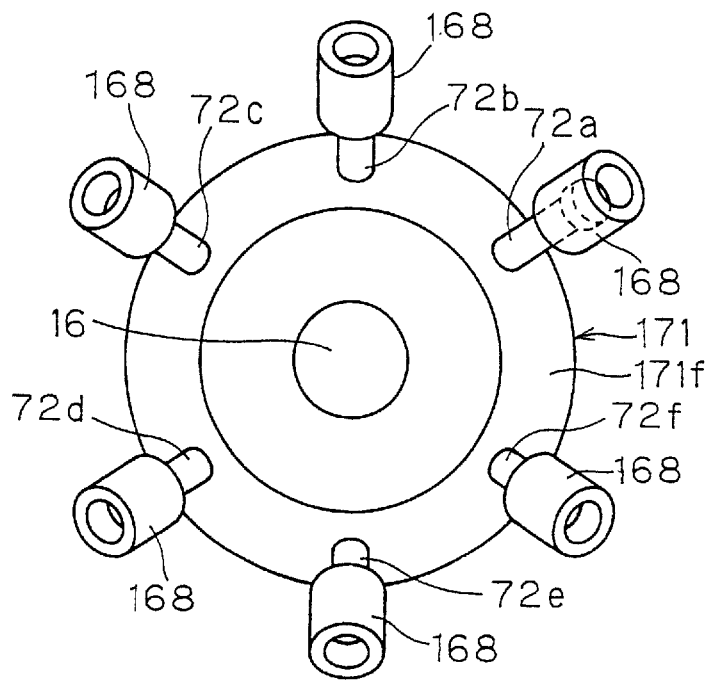
FIG. 7 is a view corresponding to FIG. 4 in this other embodiment.
Figure 8:
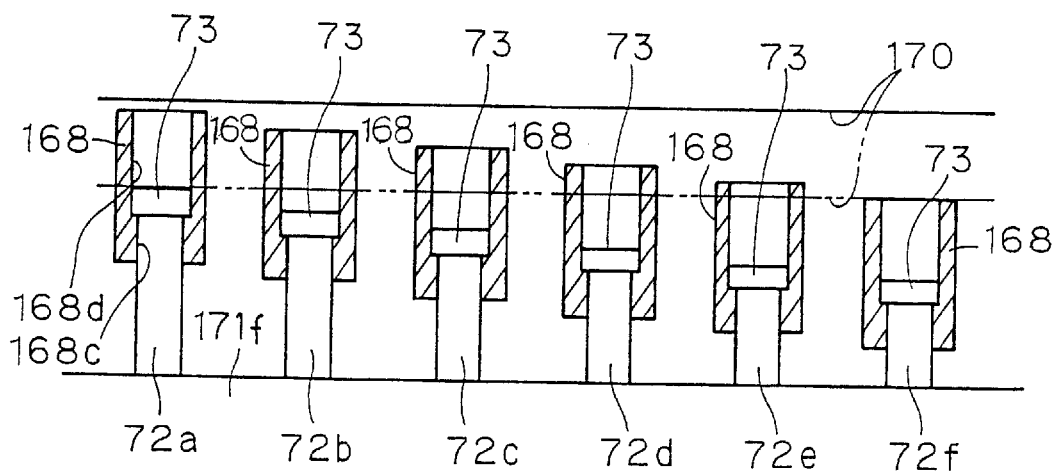
FIG. 8 is a view corresponding to FIG. 5 in this other embodiment.

The rotor 171 is a member having a deformed cylindrical shape and a cone surface 171*f* having the same center as the brake liner 170 is formed on the left outer surface of the rotating portion with a predetermined space from the brake liner 170. Also, an engaging groove 171*c* to be engaged with the coupling pin 124 is formed on the right end of the rotor 171. As shown in FIGS. 7 and 8, the guide shafts 72*a* to 72*f* are radially provided with the cone surface 171*f*. The rotary member 166 is non-rotatably coupled to the spool spindle 16 in a movable manner in the axial direction by the coupling pin 124 and is rotatably supported by the rotation supporting member 65 in a non-movable manner in the axial direction. For this reason, the rotary member 166 rotates together with the spool 12. However, the rotary member 166 does not move in the axial direction if the spool spindle 16 is moved in the axial direction.

As shown in FIGS. 7 and 8, the length of each of the six guide shafts 72*a* to 72*f* differs from each other and, for instance, the length may be reduced from the guide shaft 72*a* in alphabetical order with the guide shaft 72f be the shortest. The base portion of each of the guide shafts 72a to 72f is fixed to the cone surface 171f. A stopper portion 73 having a large diameter for restricting the movement of the respective braking member 168 in the outward direction to the respective limit position is formed at the end portion of each of the guide shafts 72a to 72f. Herein, the length of the guide shaft 72a, as shown in FIG. 8, is set to a length at which ends of the braking members 168 shifted peripherally outward, when the stationary member 167 is in its retracted position parted furthest from the rotary member 166, cannot contact on the brake liner 170. At the same time, when the stationary member 167 is in its advanced position, drawn closest to the rotary member 166, its leading edge does not touch the brake liner 170. Also, the length of the guide shaft 72f is predetermined so that the end of the braking member 168 which moved outwardly may make contact with the brake liner 170 when the stationary member 167 is located at the most advanced position. The length of each of the guide shafts 72b to 72e may be predetermined so that it differs from each other with an equal interval between the guide shafts 72b and 72e.

Each of the braking members 168 is a cylindrical member 168 and may make contact with the brake liner 170 by the centrifugal force. Each of the braking member 168 is movably coupled to the respective guide shafts 72a to 72f in a movable manner in the axial direction. A small diameter portion 168c which is supported by the respective guide shafts 72a to 72f and a large diameter portion 168d supported by the stopper portion 73 are formed on the inner surface of the respective braking member 168. The inner diameter of the small diameter portion 168c is larger than the guide shafts 72a to 72f and smaller than the stopper portion 73. The inner diameter of the large diameter portion 168d is larger than the stopper portion 73. For this reason, the movement of each of the braking members 168 in the outward direction is restricted to a limit position different from each other.

As shown in FIG. 6, the stationary member 167 is non-rotatably coupled to the outer periphery of the bearing housing 164a of the brake case 164 in a movable manner in the back and forth direction of the axial direction of the rotary member 166. In FIG. 6, it is shown that the upper portion is placed at a receded position and the lower portion is placed at an advanced position. The stationary member 167 includes a cylindrical portion 167a having a cone shape and the supporting portion 167b which is supported by the bearing housing 164a. The cylindrical portion 167a faces the outer periphery side of the rotary member 166 so as to be concentric with the rotary member 166. The brake liner 170 is fixed to the inner side of the cylindrical portion 167a. The supporting portion 167b is a ring-shape member having, for instance, serration teeth on the inner periphery thereof to be engaged with serration teeth formed on the outer periphery surface of the bearing housing 164a. The cam projection 192 of an arc shape is formed on the outer side surface of the supporting portion 167b. In this configuration, the stationary member 167 may be non-rotatably supported by the brake case 164 in a movable manner in the back and forth direction.

The braking force adjusting mechanism 169 is a mechanism for moving the stationary member 167 in the back and forth direction (i.e., the spool axis direction) and includes the knob 180 and the converting mechanism 181. The knob 180 is rotatably supported by the bearing housing 164a. The converting mechanism 181 converts the rotation of the knob 180 to the back and forth movement of the stationary member 167. The knob 180 is exposed outside of the side cover 106 and may be operated from outside of the reel body 1. A cam groove 82 which forms a part of the converting mechanism 181 is formed at the right end surface of the knob 180. The cam groove 82 has an arc shape and its depth differs depending on the rotational angle. For instance, the depth becomes gradually shallow when the knob 180 is rotated in one direction. The end of the cam projection 192 of the stationary member 167 makes contact with the cam groove 82. The converting mechanism 181 includes the cam groove 82, the cam projection 192, and the return spring 83. The return spring 83 is disposed at the outer periphery of the bearing housing 164a between the collar 65a and the stationary member 167 in a compressed state. The return spring 83 urges the stationary member 167 towards the left-hand side of FIG. 3 (i.e., towards a receded position).

In the braking force adjusting mechanism 169, when the knob 180 is rotated in one direction, the cam projection 192 runs on the cam groove 82 and the stationary member 167 is moved forwardly in the right-hand direction in FIG. 3. On the other hand, when the knob 180 is rotated in the opposite direction, the stationary member 167 moves backward due to the urging force of the return spring 83. In this embodiment, since the brake liner 170 has the cone shape surface, the diameter of a circle formed by the contact of the braking members 168 with the brake liner 170 varies in accordance with the movement of the fixing member 7 in the axial direction. Accordingly, the distance required for each of the braking members 168 to move in order to make contact with the brake liner 170 changes and, hence, the number of the braking members 168 which are capable of making contact with the brake liner 170 varies. Thus, the braking force may be easily adjusted by an operation from outside of the reel body 1.

In this embodiment, if the stationary member 167 is placed at the most receded position using, for instance, the braking force adjusting mechanism 169, no braking members 168 may make contact with the brake liner 170 and, hence, no braking force is applied to the spool 12. When the knob 180 is rotated so that the stationary member 167 gradually moves towards the rotary member 166, the braking members 168 start to make contact with the brake liner 170 and the number of the braking members 168 that make contact with the brake liner 170 increases depending on the degree of movement of the stationary member 167. As a result, the braking force of the centrifugal braking mechanism 123 gradually increases. Finally, when the stationary member 167 reaches the most advanced position, all of the braking members 168 may make contact with the brake liner 170 and the braking force reaches its maximum.

(b) Although the braking force is changed in proportion to the degree of movement of the knob 80 or 180 by using different movement limit positions for each of the braking members 68 or 168 in the above embodiments, the movement limit position for some of the braking members 68 or 168 may be set as identical so that the braking force may be rapidly changed depending of the movement of the knob 80 or 180.

(c) Although the coupling pins 24 or 124 are used as a coupling means in the above embodiments, any coupling means is acceptable as long as it non-rotatably couples the rotary member 66 or 166 to the spool spindle 16, which is an interlocking member, in a movable manner in the axial direction.

Figure 9:
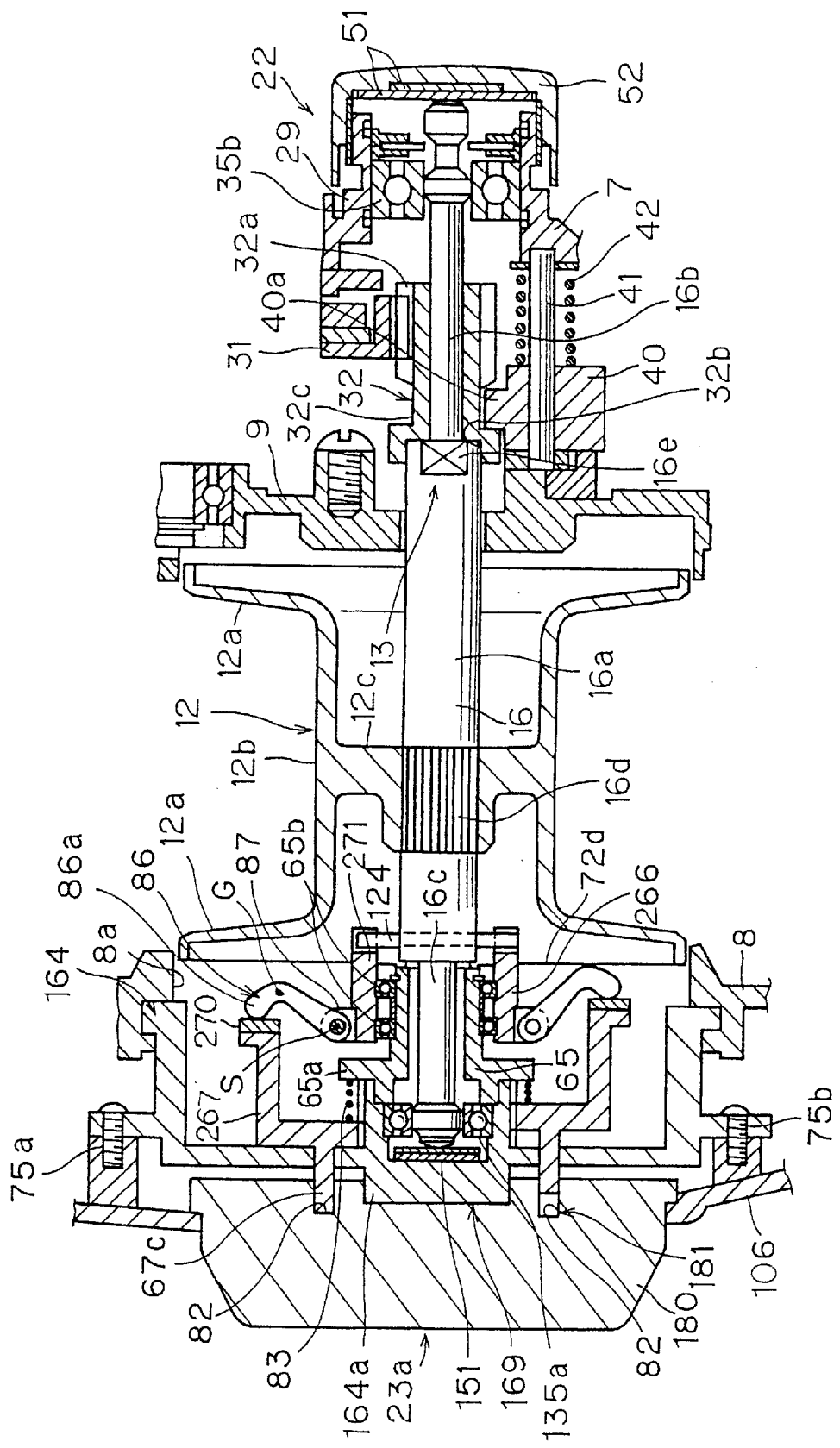
FIG. 9 is a diagram corresponding to FIG. 3 in yet another embodiment.

(d) Although the braking members 68 or 168 are movably coupled to the respective guide shaft 72 or 72a through 72f so that they may move in the radius direction by a centrifugal force in the above embodiment, as shown in FIG. 9, braking members 86 may be pivotably coupled to the rotary member 266. In such a configuration, the rotary member 266 includes the rotor 271 and rockers 87 for movably coupling the respective braking member 86 to the rotor 271. Thus, the braking members 86 are movably coupled to the rotary member 266. Each of the rockers 87 is disposed in the circumferential direction of the rotor 271 with a space between each other and movably couples the braking members 86 around an axis along the chord direction. Each of the braking members 86 has a lever shape and its end portion 86 is curved outwardly towards the spool axis direction. The position G of the center of gravity of the braking members 86 is placed at the spool 12 side with respect to the center of movement S. The stationary member 267 may make contact with the end portion 86a of the braking members 86 and has an annularly shaped brake liner 270 orthogonal to the rotational axis of the rotary member 266. The configuration in which the rotary member 266 is rotatably supported by the rotation supporting member 65 in a non-movable manner in the axial direction and the rotary member 266 is non-rotatably coupled to the spool spindle 16 in a movable manner in the axial direction is the same as the above embodiment.

In the centrifugal braking mechanism 123 having the above-mentioned configuration, when the spool 12 is rotated and a centrifugal force is applied to the braking members 86, the end portion 86a of the braking members 86 moves towards the brake liner 270 and makes contact with the brake liner 270 to brake the spool 12. The braking force applied at that time depends on moment, which is determined by the shortest distance between the center of gravity G and the center of movement S of the braking members 86 and the centrifugal force acting on the center of gravity G, and the shortest distance between the center of movement S and the contacting position of the braking members 86 with the brake liner 270. For this reason, the braking force obtained is weaker than that obtained in the above embodiment. Also, the adjustment of the braking force is carried out by moving the stationary member 267 in the axial direction so that the center of gravity G is moved with respect to the center of movement S. Thus, although the braking force may be changed continuously, the degree of change is relatively small.

In this embodiment, effect similar to the above-mentioned embodiment may be obtained since the distance between the rotary member 266 and the stationary member 267 is not changed when the spool spindle 16 is moved in the axial direction.

(e) Although the rotary member 266 is coupled to the spool spindle 16 via the coupling pin 124 in the foregoing embodiment, the rotary member 266 may be directly coupled to the spool 12 via a coupling means.

(f) Although the coupling means is always maintained in a coupling state in the above embodiment, it is possible to adapt a structure in which the state of a coupling means may be switched from a coupling state to a non-coupling state or vice versa. In such a case, regardless of the setting of the braking state of the centrifugal braking mechanism, the braking force may be instantly released by simply switching to the non-coupling state. Similarly, the braking force may be restored to its original strength by switching to the coupling state.

According to the present invention, the friction state between the braking members and the fixing members is changed by the position of the fixing member in the axial direction and the braking force may be changed accordingly.

Thus, the braking force may be adjusted by a simple operation in which the fixing member is moved in the axial direction of the rotating member by using the braking force adjusting means. Also, the rotating member is rotatably disposed in the reel body in a non-movable manner in the axial direction and is coupled to an interlocking member by a coupling means in a movable manner in the axial direction. Thus, if the interlocking member such as the spool shaft is moved in the axial direction, the rotating member does not move in the axial direction and the distance between the rotating member and the fixing member does not change unless the fixing member is forced to move. For this reason, the predetermined braking force is not changed even if the interlocking member is moved and, therefore, the adjustment of the braking force may be performed accurately.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. In a dual-bearing reel a braking device for braking a spool fitted in a reel body of the dual-bearing reel, the dual-bearing reel braking device comprising:

a rotary member supported in the reel body to be rotatable yet axially immobile relative to the reel body;

a plurality of braking members for moving under centrifugal force, movably fitted on said rotary member;

a stationary member non-rotatably fitted on the reel body, said stationary member being axially movable relative to said rotary member for contact in differing frictional states with said braking members shifted under centrifugal force;

coupling means for non-rotatably coupling said rotary member to a linking member that is linked to the spool, such that said rotary member is axially movable with respect to the spool; and braking force adjusting means for shifting said stationary member in the axial direction to adjust braking force developing from said braking members contacting said stationary member.

2. The dual-bearing reel braking device set forth in claim 1, wherein:

said linking member includes a spool spindle;

the spool is non-rotatably coupled to said spool spindle; and said coupling means is provided on said spool spindle and couples said rotary member to said spool spindle non-rotatably such that said rotary member is axially movable relative to said spool spindle.

3. The dual-bearing reel braking device set forth in claim 1, wherein:

peripherally outward of said rotary member, said stationary member has on an inner peripheral surface thereof a conically shaped braking face disposed concentric with said rotary member, said braking face flaring toward the spool; and said braking members are fitted to said rotary member for contact with said braking face under centrifugal force, said braking members being arranged radially toward said braking face and permitted to travel as far as mutually differing travel-limiting positions.

4. The dual-bearing reel braking device set forth in claim 3, wherein said braking members are fitted on said rotary member to be permitted to shift in a direction substantially orthogonal to said braking surface.

5. The dual-bearing reel braking device set forth in claim 3, wherein said stationary member comprises:

a support portion supported on said reel body to be non-rotatable yet axially movable relative to said spool, and a main body formed integrally with said support portion, said main body having a conically shaped inner peripheral surface in which said braking face is provided; and wherein said braking force adjusting means comprises:

a knob movably fitted to and permitted to move relative to said reel body, said knob being exposed to an exterior of said reel body, and a converting mechanism for converting the movement of said knob to an axial movement of said main body relative to said spool.

6. The dual-bearing reel braking device set forth in claim 1, wherein said braking members are pivotably fitted to axes along chord directions of said rotary member, said braking members being arranged radially and spaced apart circumferentially of said rotary member, positions of centers of gravity of said braking members being disposed more toward said spool than the pivoting centers of said braking members; and said stationary member has an annular braking face approximately orthogonal to the rotational axis of said rotary member, said braking face being capable of contacting ends of said braking members.

7. The dual-bearing reel braking device set forth in claim 1, further comprising a casting control mechanism for braking said spool by grasping said linking member.

8. A centrifugal braking mechanism for spool-cast braking in a dual-bearing reel having a casting control mechanism for adjustable, direct spool-spindle braking, the centrifugal braking mechanism comprising:

a brake cylinder non-rotatably yet axially movably supported in a housing in which a spool-spindle bearing is fitted on a spool-flange end of the dual-bearing reel, said brake cylinder having a rim-ward brake lining;

a centrifugal-braking rotary member rotatively supported by the spool-spindle bearing, yet said rotary member being axially immobile relative to a spool-flange end of the dual-bearing reel, said rotary member carrying braking elements for circumferentially contacting the brake lining to develop spool-braking force differentiated in correspondence with axial movement of said brake cylinder; and a rotary member cylindrical extension configured for rotational interlocking with a spool-spindle link that permits spool-spindle to shift axially; wherein the spool-spindle axial shift is such that spool-braking force in the centrifugal braking mechanism is adjustably differentiated regardless of casting control mechanism adjustment.

\* \* \* \* \*